(12) United States Patent
Benson

(10) Patent No.: US 7,578,433 B1
(45) Date of Patent: Aug. 25, 2009

(54) SYSTEM AND METHOD FOR TRACKING ANIMALS USING BAR CODING

(76) Inventor: Brock T. Benson, 10658 Gunston Rd., Lorton, VA (US) 22079

( * ) Notice: Subject to any disclaimer, the term of this patent is extended or adjusted under 35 U.S.C. 154(b) by 11 days.

(21) Appl. No.: 11/702,041

(22) Filed: Feb. 5, 2007

(51) Int. Cl.
*G06F 17/00* (2006.01)
(52) U.S. Cl. .................................. 235/375; 235/462.01
(58) Field of Classification Search .................. 235/375
See application file for complete search history.

(56) References Cited

U.S. PATENT DOCUMENTS

| | | | | |
|---|---|---|---|---|
| 3,360,877 | A * | 1/1968 | Estep | 40/300 |
| 5,036,610 | A * | 8/1991 | Fehr | 40/300 |
| D422,757 | S | 4/2000 | Levine | |
| 6,439,169 | B1 * | 8/2002 | Miyawaki | 119/858 |
| D480,182 | S | 9/2003 | McAnally | |
| 6,878,052 | B2 * | 4/2005 | Andersson | 452/149 |
| 2005/0051109 | A1 * | 3/2005 | Fantin et al. | 119/721 |
| 2005/0209526 | A1 * | 9/2005 | Ingley et al. | 600/529 |

* cited by examiner

*Primary Examiner*—Daniel A Hess
*Assistant Examiner*—Ali Sharifzada
(74) *Attorney, Agent, or Firm*—Crossley Patent Law; Mark A. Crossley

(57) ABSTRACT

A System and Method for Tracking Animals Using Bar Coding providing an infrared readable tag containing a bar code to identify and provide medical and other information about an animal. Information-sharing among animal owners, veterinarians, kennel operators, and boarding facilities is achieved by interconnected bar code, personal digital assistant, computer database, central processing unit, and Internet, which are used to input, store, download, collect, access, and otherwise use information about an animal. The present invention may be used to assist in locating owners of lost animals and in providing an animal's medical history, especially for emergency treatment.

1 Claim, 4 Drawing Sheets

SYSTEM AND METHOD FOR TRACKING ANIMALS USING BAR CODING

BACKGROUND OF THE INVENTION

The present System and Method for Tracking Animals Using Bar Coding Tags, ("present System"), was developed by the inventor as a result of his experience as a kennel operator and dog trainer. The inventor believes the present System fulfills the need for an electronic means of providing positive identification for a pet while also containing its complete medical history and other vital information in a paper-free manner.

FIELD OF THE INVENTION

The System and Method for Tracking Animals Using Bar Coding relates to, and more especially to a

SUMMARY OF THE INVENTION

The general purpose of the System and Method for Tracking Animals Using Bar Coding, described subsequently in greater detail, is to provide an electronic means of identifying an animal and provide the owner's name of such animal along with such animal's vaccination history, veterinarian, and other information such as daily care updates when a pet is lodged at a boarding facility. The present System and Method for Tracking Animals Using Bar Coding has many novel features that result in an improved animal identification system which is not anticipated, rendered obvious, suggested, or even implied by prior art, either alone or in combination thereof.

To attain this, the present System and Method for Tracking Animals Using Bar Coding provides a system of electronically storing, scanning and updating all vital information for an animal. The present System comprises a bar-coded collar tag which is readable through a wireless infrared port of a personal digital assistant ("PDA"). The veterinarian or boarding staff are able to use the PDA to update a computer database with a wireless download from the PDA. The PDA could also update the collar tag data content. The computer database could be linked to the Internet. This would allow a pet owner to easily check upon the status of a pet at a kennel or boarding facility while the owner was away on vacation. This present System also assists in the return of a lost pet to its owner. In addition, the present System provides a veterinarian with a pet's complete medical history should a pet require emergency treatment.

Thus has been broadly outlined the more important features of the improved System and Method for Tracking Animals Using Bar Coding so that the detailed description thereof that follows may be better understood and in order that the present contribution to the art may be better appreciated.

It is, therefore, an object of the System and Method for Tracking Animals Using Bar Coding provide an electronic means for positively identifying a pet.

Another object of the System and Method for Tracking Animals Using Bar Coding is to provide a paper-free means for providing an animal's complete medical history and other vital information.

An added object of the System and Method for Tracking Animals Using Bar Coding is to automate the process of keeping pet records for veterinarians and pet boarding facilities.

It is a further object of the System and Method for Tracking Animals Using Bar Coding to provide a basic identification function to aid in returning lost pets to their owners.

These together with additional objects, features and advantages of the improved System and Method for Tracking Animals Using Bar Coding will be readily apparent to those of ordinary skill in the art upon reading the following detailed description of presently preferred, but nonetheless illustrative, embodiments of the improved System and Method for Tracking Animals Using Bar Coding when taken in conjunction with the accompanying drawings.

In this respect, before explaining the current embodiments of the improved System and Method for Tracking Animals Using Bar Coding in detail, it is to be understood that the System and Method for Tracking Animals Using Bar Coding is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved System and Method for Tracking Animals Using Bar Coding. It is therefore important that the claims be regarded as including such equivalent constructions insofar as they do not depart from the spirit and scope of the System and Method for Tracking Animals Using Bar Coding. It is also to be understood that the phraseology and terminology employed herein are for purposes of description and should not be regarded as limiting.

DETAILED DESCRIPTION OF THE DRAWINGS

With reference now to the drawings, and in particular FIGS. 1 through 4 thereof, the principles and concepts of the System and Method for Tracking Animals Using Bar Coding generally designated by the reference number 10 will be described.

Figure 1:
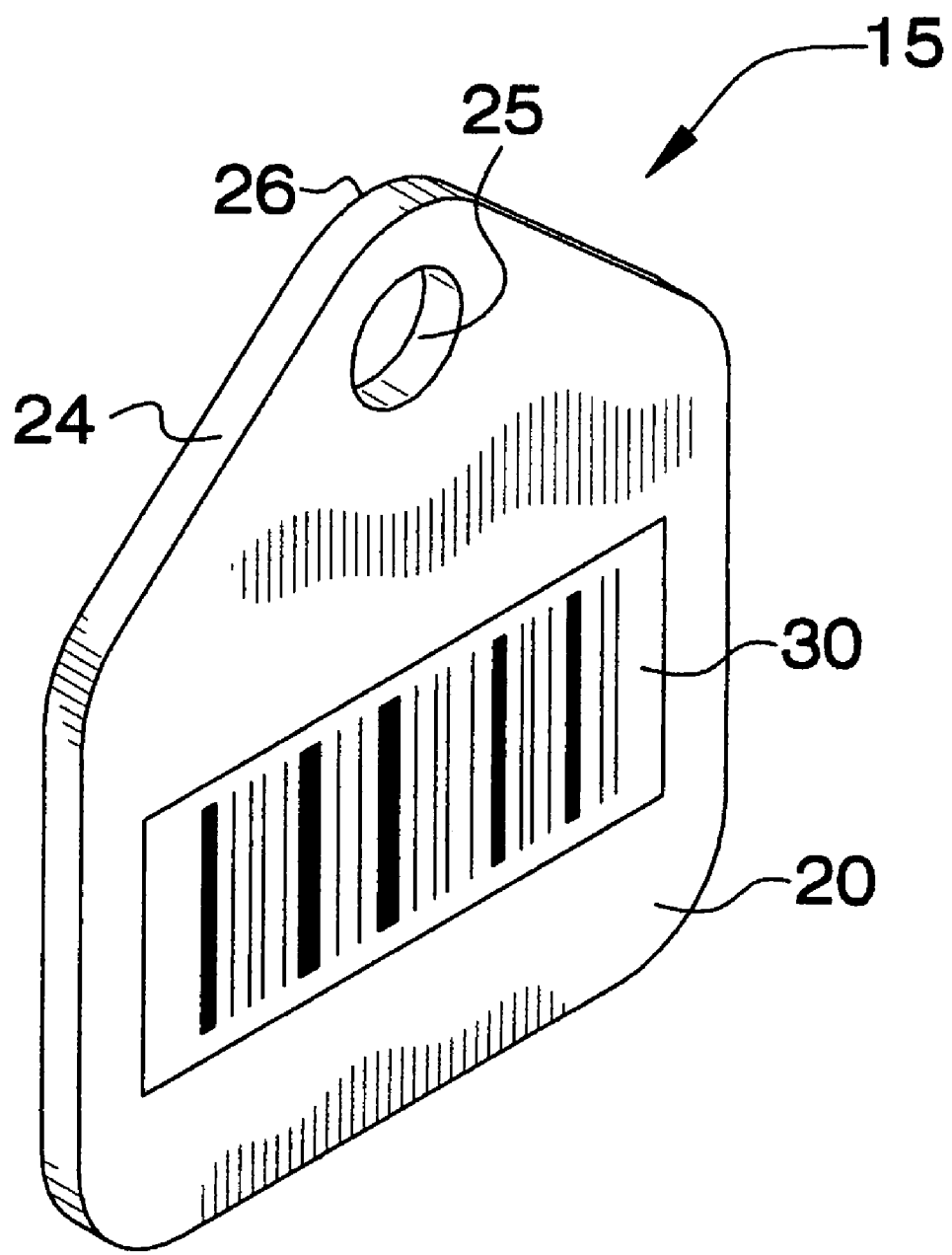
FIG. 1 is a perspective view of the front side of a bar-coded collar tag according to the present invention.
Figure 2:
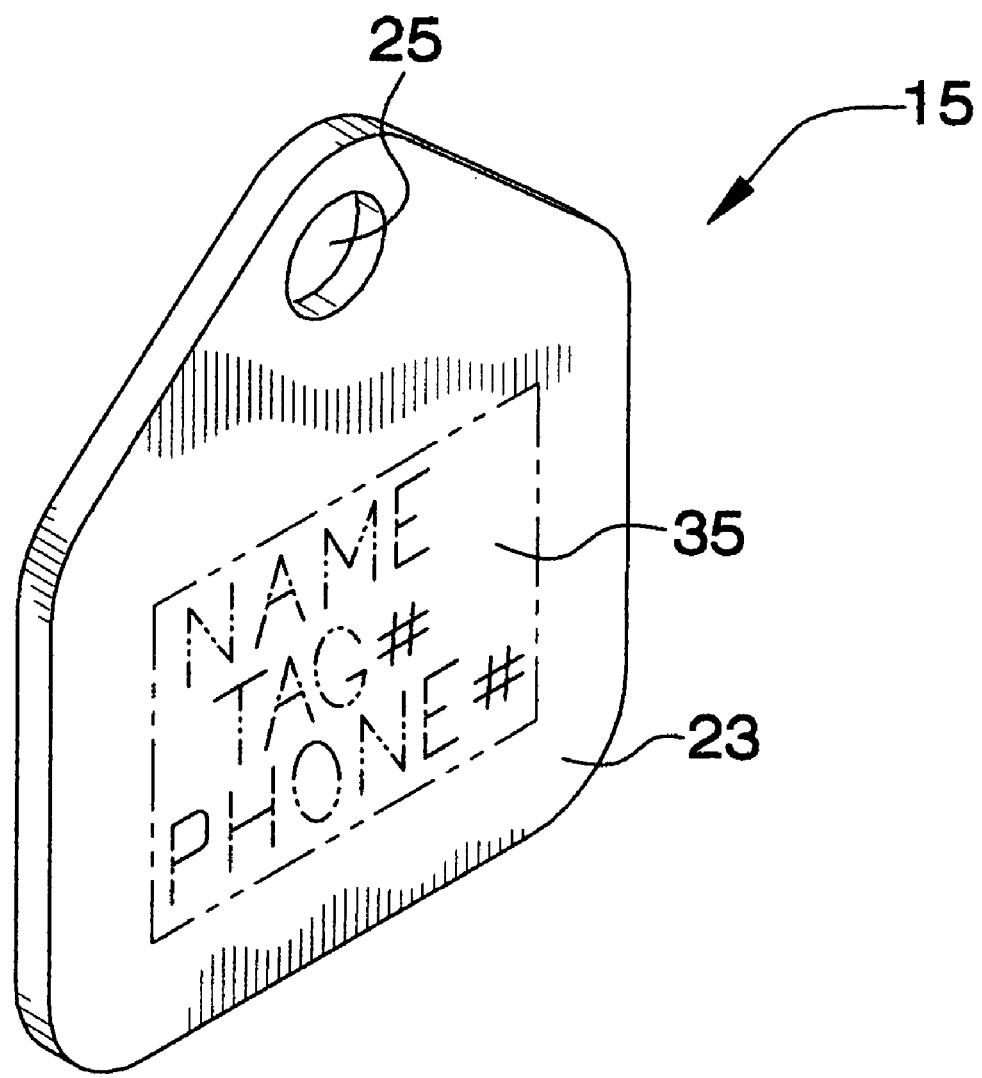
FIG. 2 is a perspective view of the rear side of a bar-coded collar tag according to the present invention.

Referring to FIGS. 1 and 2, a bar-coded tag 15 according to the present System and Method for Tracking Animals Using Bar Coding 10 is illustrated. Said generally pentagon-shaped tag 15 made of material which is weather-proof, light-weight and durable, such as hard molded plastic. Infrared readable data in the form of a bar code 30 is affixed to said tag 15. Said tag 15 comprises a flat-faced front side 20 (shown in FIG. 1) and a flat-faced back side 23 (shown in FIG. 2), bounded together by a continuous edge 24. Said tag 15 is provided with an opening 25 therethrough adjacent the top edge 26 for receiving an animal collar 90 (shown in FIG. 3) for securing said tag 15 about an animal's neck. Said tag 15 may also be affixed to an animal's neck chain. Affixed to said front side 20 is a bar code 30. Affixed to said back side 23 is an indicia-bearing patch 35 arranged so that the indicia thereon provides visible information about an animal bearing said tag 15, such as the animal's name, said animal's tag number, said animal owner's name, and the animal owner's telephone number. Said patch 35 may be in the form of indicia embedded into said tag 15 or in the form of a sticker or other weather-proof, durable form. Said bar code 30 may be affixed to said back side 23, while said indicia-bearing patch 35 may be affixed to said front side 20, as illustrated. However, said bar code 30 and indicia-bearing patch 35 may affixed in other arrangements to said tag 15.

Figure 3:
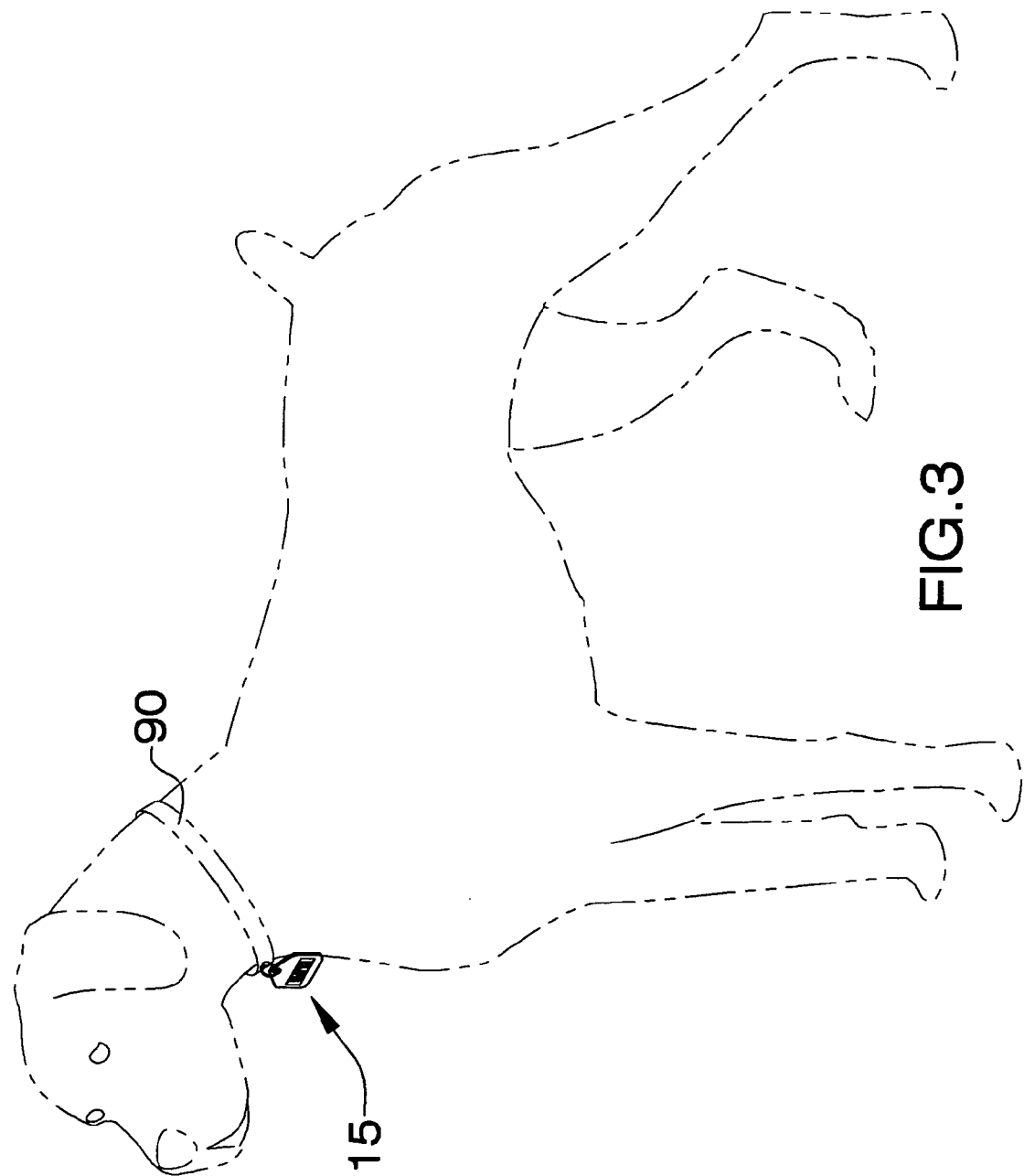
FIG. 3 is an in-use view of a bar-coded collar tag according to the present invention, illustrated as being worn by a dog.

FIG. 3 illustrates a bar-coded tag 15 according to the present System and Method for Tracking Animals Using Bar Coding 10, as being attached to an animal collar 90 and worn by a dog. Said bar-coded tag 15 is adaptable to being affixed to an animal collar 90 or neck chain for almost any animal which is capable of bearing an animal collar 90 or neck chain.

Figure 4:
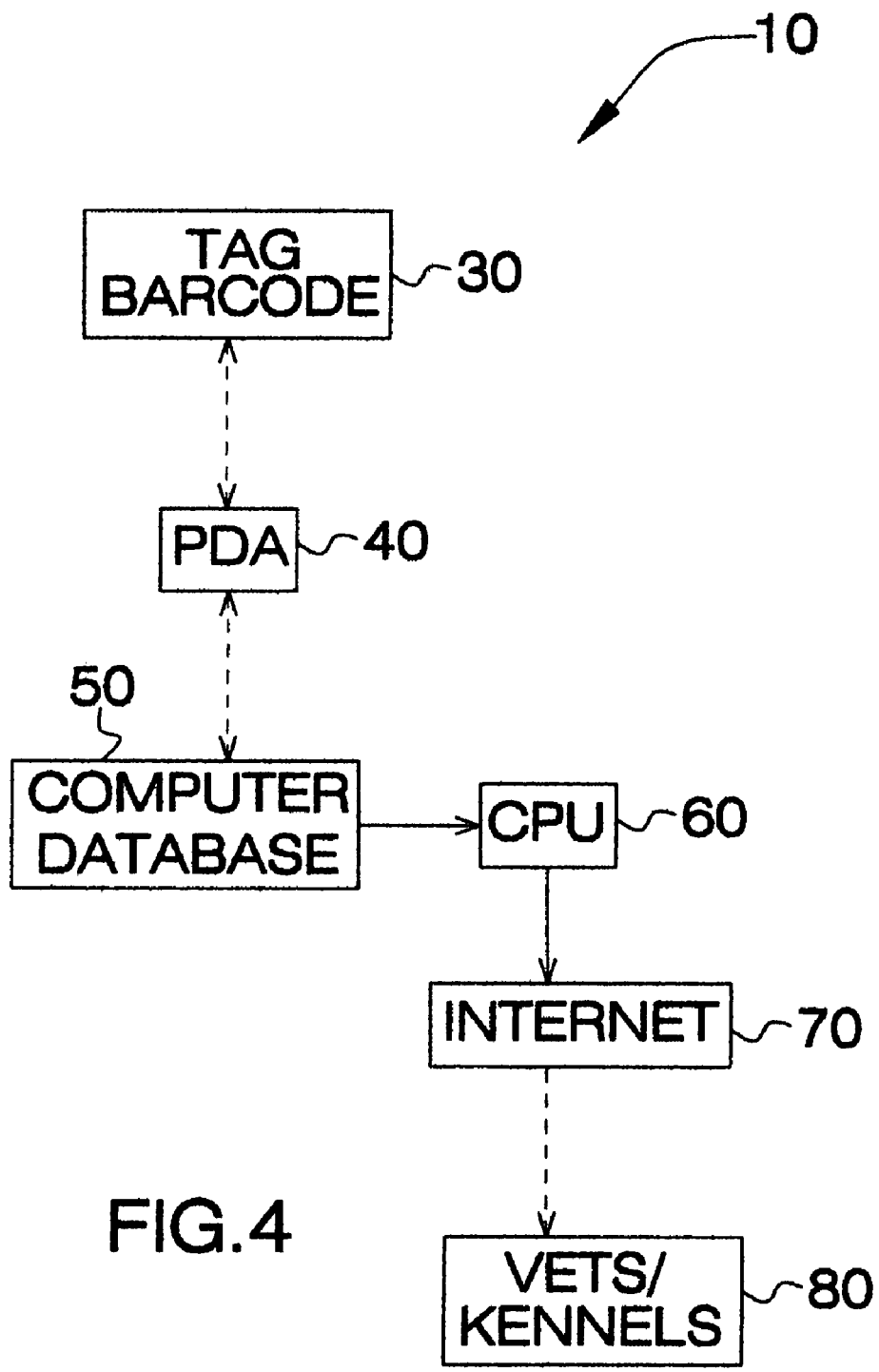
FIG. 4 is a schematic flowchart illustrating System components according to the present invention.

Directing attention to FIG. 4, there is shown an overview of the present System and Method for Tracking Animals Using Bar Coding 10 in which information about an animal is input into a bar-coded tag 15 via a personal digital assistant 40 ("PDA"). Such information may also be downloaded via a personal digital assistant 40 and further into a computer database 50. Such information may also be downloaded from said computer database 50 onto said PDA 40 and, further onto said bar code 30. Information downloaded into said computer database 50 may be downloaded into a central processing unit ("CPU") 60. Said information about an animal may be further downloaded onto the Internet 70. Said information may be downloaded onto and stored on the Internet 70 may be accessed by animal care takers, such as veterinarians, kennels, animal shelters, or other boarding facilities, collectively illustrated as 80. Said animal caretakers 80 would be able to use the PDA 40 to enter, collect, update, and store animal-specific information on said computer database 50 with a wireless download from said PDA 40. Said PDA could also be used to enter, collect, update and store information about a given animal on such animal's tag 15. With a link between said computer database 50 to the Internet 70, animal owners could check the status of their animals staying with an animal caretaker, such as a veterinarian, kennel, animal shelter, or other boarding facility 80 while the owners were away from the animal. The present System and Method for Tracking Animals Using Bar Coding 10 could assist in the return of a lost pet or animal to its owner and provide an animal caretaker with an animal or pet's complete medical history, especially in the event that an animal or pet require emergency treatment.

With respect to the above description then, it is to be realized that the optimum dimensional relationships for the parts of the System and Method for Tracking Animals Using Bar Coding, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the System and Method for Tracking Animals Using Bar Coding.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the System and Method for Tracking Animals Using Bar Coding may be used.

Therefore, the foregoing is considered as illustrative only of the principles of the System and Method for Tracking Animals Using Bar Coding. Further, since numerous modifications and changes will readily occur to those skilled in the art, it is not desired to limit the System and Method for Tracking Animals Using Bar Coding to the exact construction and operation shown and described, and accordingly, all suitable modifications and equivalents may be resorted to, falling within the scope of the System and Method for Tracking Animals Using Bar Coding.

What is claimed is:

1. A method for tracking animals utilizing a system, the method comprising:

utilizing a system comprising, in combination:

a weather-proof, light-weight, durable tag comprised of a front side and back side, bounded together by a continuous edge, said tag being provided with an opening therethrough;

a bar code affixed to either said front side or said back side of said tag;

a plurality of animal-specific information selectively encoded within said bar code, the information consisting of:

an animal's name selectively encoded within said bar code; an animal's owner's name selectively encoded within said bar code;

an animal's owner's address selectively encoded within said bar code;

an animal's owner's telephone number selectively encoded within said bar code;

an animal's medical history selectively encoded within said bar code;

an animal's status selectively encoded within said bar code;

an animal's location selectively encoded within said bar code;

an indicia-bearing patch affixed to an opposite side of said tag from said bar code wherein said indicia-bearing patch provides visible information about said animal;

a personal digital assistant having Internet access;

a computer having a computer database, a central processing unit, and Internet access; and an animal collar removably receiving said tag;

affixing said bar code onto said tag utilizing said personal digital assistant;

affixing said tag onto an animal collar;

selectively downloading said animal-specific information from said bar code into said computer database;

selectively downloading said animal-specific information from said bar code stored in said computer database into a central processing unit;

selectively downloading said animal-specific information from said personal digital assistant onto the Internet;

selectively downloading said animal-specific information from said database downloaded onto said central processing unit onto the Internet;

selectively accessing said animal-specific information stored on said personal digital assistant;

selectively accessing said animal-specific information stored on said computer database;

selectively accessing said animal-specific information stored on the Internet;

exchanging said animal-specific information among animal caretakers;

returning an animal to an animal caretaker.

* * * * *